United States Patent
Anandappan et al.

(10) Patent No.: US 10,679,503 B2
(45) Date of Patent: Jun. 9, 2020

(54) MONITOR AND CONTROL OF SURFACE TRAFFIC AT AIRPORT

(71) Applicant: Honeywell International Inc., Morris Plains, NJ (US)

(72) Inventors: Thanga Anandappan, Bangalore (IN); Aloke Roy, Gaithersburg, MD (US); Chinmaey Sharad Shende, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 59 days.

(21) Appl. No.: 15/479,901

(22) Filed: Apr. 5, 2017

(65) Prior Publication Data

US 2018/0040252 A1 Feb. 8, 2018

(30) Foreign Application Priority Data

Aug. 5, 2016 (IN) .............................. 201641026764

(51) Int. Cl.
| | | |
|---|---|---|
| *G08G 1/16* | (2006.01) | |
| *G01S 5/02* | (2010.01) | |
| *G01S 5/00* | (2006.01) | |
| *G08G 5/00* | (2006.01) | |
| *G08G 1/13* | (2006.01) | |
| *H04W 4/06* | (2009.01) | |
| *G01S 19/46* | (2010.01) | |
| *H04W 4/40* | (2018.01) | |

(Continued)

(52) U.S. Cl.
CPC ............ *G08G 1/164* (2013.01); *G01S 5/0027* (2013.01); *G01S 5/0081* (2013.01); *G01S 5/0294* (2013.01);

(Continued)

(58) Field of Classification Search
CPC ........ G08G 1/164; G08G 1/13; G08G 5/0013; G08G 5/0021; G08G 5/0026;

(Continued)

(56) References Cited

U.S. PATENT DOCUMENTS 5,835,059 A 11/1998 Nadel et al.
8,138,964 B2 3/2012 Donovan (Continued)

FOREIGN PATENT DOCUMENTS

EP 2575122 4/2013

OTHER PUBLICATIONS

European Patent Office, "Extended European Search Report for EP Application No. 17181321.5", "Foreign Counterpart to U.S. Appl. No. 15/479,901", dated Jan. 19, 2018, pp. 1-10, Published in: EP.

(Continued)

*Primary Examiner* — Hussein Elchanti

(57) ABSTRACT

A surface movement, guidance and control system is provided. The system includes a plurality of base stations, disposed at a site, each base station providing a coverage area and having a known geo location and using an IP-based high data rate radio link with low latency. Each base station is adapted to receive periodic positional updates from vehicles on the site over the IP-based high data rate radio link. The system also includes a server. The server is communicatively coupled to the plurality of base stations. The server is configured to track and periodically transmit the location of the vehicles to the base stations. Each base station broadcasts vehicle position information.

20 Claims, 8 Drawing Sheets

(51) Int. Cl.
  *G01S 19/41* (2010.01)
  *G08G 5/06* (2006.01)
  *G01S 19/48* (2010.01)
  *H04W 4/44* (2018.01)
  *H04W 4/02* (2018.01)
  *H04L 12/18* (2006.01)
  *G01S 19/13* (2010.01)

(52) U.S. Cl.
  CPC .............. *G01S 19/41* (2013.01); *G01S 19/46* (2013.01); *G01S 19/48* (2013.01); *G08G 1/13* (2013.01); *G08G 5/0013* (2013.01); *G08G 5/0021* (2013.01); *G08G 5/0026* (2013.01); *G08G 5/0043* (2013.01); *G08G 5/0078* (2013.01); *G08G 5/0082* (2013.01); *G08G 5/065* (2013.01); *H04W 4/02* (2013.01); *H04W 4/06* (2013.01); *H04W 4/40* (2018.02); *H04W 4/44* (2018.02); *G01S 19/13* (2013.01); *H04L 12/189* (2013.01)

(58) Field of Classification Search
  CPC .. G08G 5/0043; G08G 5/0078; G08G 5/0082; G08G 5/065; G01S 5/0027; G01S 5/0081; G01S 5/0294; G01S 19/41; G01S 19/46; G01S 19/48; H04W 4/046
  See application file for complete search history.

(56) References Cited

U.S. PATENT DOCUMENTS

| | | | |
|---|---|---|---|
| 9,275,550 B1 | 3/2016 | Stefani et al. | |
| 9,311,821 B2 | 4/2016 | Melum et al. | |
| 9,509,394 B1* | 11/2016 | Mitchell | H04B 7/18506 |
| 2002/0021247 A1 | 2/2002 | Smith et al. | |
| 2002/0143798 A1* | 10/2002 | Lisiecki | H04L 67/1095 |
| 2003/0079027 A1* | 4/2003 | Slocombe | H04L 29/06 |
| | | | 709/229 |
| 2004/0122730 A1* | 6/2004 | Tucciarone | G06Q 10/107 |
| | | | 705/14.36 |
| 2004/0133341 A1 | 7/2004 | Spriggs | |
| 2004/0225432 A1* | 11/2004 | Pilley | G01C 23/00 |
| | | | 701/117 |
| 2005/0138196 A1* | 6/2005 | Pfeffer | G06Q 10/107 |
| | | | 709/231 |
| 2010/0090891 A1* | 4/2010 | Donovan | G08G 5/06 |
| | | | 342/357.27 |
| 2015/0319233 A1* | 11/2015 | Lv | H04L 67/1034 |
| | | | 709/224 |
| 2016/0119832 A1 | 4/2016 | Nakamura | |
| 2018/0090019 A1* | 3/2018 | Scacchi | G01C 23/00 |
| 2019/0159237 A1* | 5/2019 | Wei | H04L 5/0064 |

OTHER PUBLICATIONS

Aeromacs, "Delivering Next Generation Communications to the Airport Surface", Apr. 17, 2015, pp. 1-23, Publisher: WiMAX Forum.

Gheorghisor et al., "Analyses and Simulations for Aeronautical Mobile Airport Communications System", "The Center for Advanced Aviation System Development (CAASD), The MITRE Corporation", Apr. 19-21, 2016, pp. 2C2-1 to 2C2-13, Publisher: 2016 Integrated Communications Navigation and Surveillance (ICNS) Conference, Published in: McLean, VA.

Anandappan et al., "Monitor and Control of Surface Traffic at Airport", "IN Patent Application No. 201641026764, Filed Aug. 5, 2016", Aug. 5, 2016, pp. 1-19, Published in: IN.

* cited by examiner

MONITOR AND CONTROL OF SURFACE TRAFFIC AT AIRPORT

BACKGROUND

This Application is a non-provisional U.S. Patent Application claiming priority to, and benefit of Indian Provisional Patent Application No. 201641026764, entitled "MONITOR AND CONTROL OF SURFACE TRAFFIC AT AIRPORT" and filed on Aug. 5, 2016, which is incorporated herein by reference in its entirety.

BACKGROUND

Many different types of vehicles travel on the surface at airports. These vehicles include aircraft as well as trucks, cars, busses and other vehicles. As these vehicles move around, there are many opportunities for accidents to occur due to the size differences of the vehicles, weather conditions, and the ever increasing volume of such traffic as the accessibility of air travel continues to expand.

Existing systems for managing surface traffic at airports have various short comings. For example, existing systems typically are centered on providing situational awareness and data to pilots of aircraft. The other surface vehicles such as baggage trucks, busses, and other support vehicles are not monitored and their position is not reported to the larger aircraft. Further, these other surface vehicles do not have access to the data on the location and trajectory of the larger aircraft.

Therefore, what is needed in the art are systems and methods for monitoring and controlling the location and activity of surface vehicles, including non-aircraft, to assist the operators of such vehicles to avoid accidents.

SUMMARY

A surface movement, guidance and control system is provided. The system includes a plurality of base stations, disposed at a site, each base station providing a coverage area and having a known geo location and using an IP-based high data rate radio link with low latency. Each base station is adapted to receive periodic positional updates from vehicles on the site over the IP-based high data rate radio link. The system also includes a server. The server is communicatively coupled to the plurality of base stations. The server is configured to track and periodically transmit the location of the vehicles to the base stations. Each base station broadcasts vehicle position information.

DETAILED DESCRIPTION

With the increase in air traffic, and thus the increase in tarmac congestion, at some airports, it has become desirable that these airports include a traffic-monitoring system that monitors and displays, in real time, the respective positions of all mobile stations (e.g., aircraft, baggage carts, emergency vehicles), and that helps airport operators to prevent collisions or other problems resulting from improper positioning or movement of mobile stations. One such system for which engineers are currently developing standards is an Aeronautical Mobile Airport Communications System (AeroMACS). Airport engineers envision that with an AeroMACS, a mobile station will determine, periodically, its position and report it to one or more servers via one or more base stations that are strategically placed in and around the airport so that wherever a mobile station is located within or around the airport, it will be within communication range of at least one base station. Engineers also envision that an AeroMACS will have other capabilities in addition to traffic monitoring. For example, engineers envision that an AeroMACS will allow a mobile station to report its status (e.g., fuel level, gate assignment, whether any components are malfunctioning) to one or more servers, and to receive instructions (e.g., to leave the gate, to hold its current position until further notice) and other information from the one or more servers.

Figure 1:
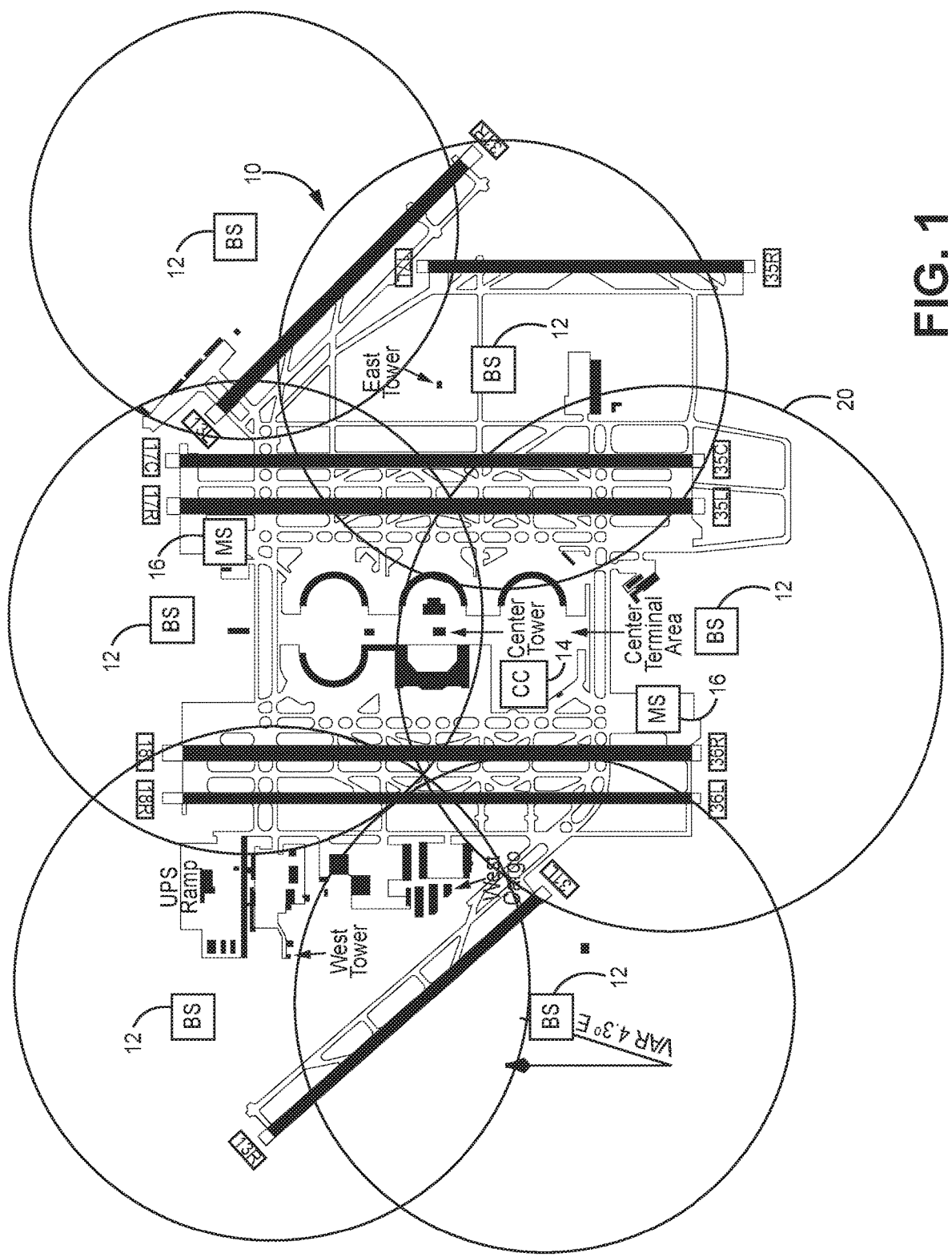
FIG. 1 is a diagram of a system for monitoring and controlling surface vehicles and aircraft at an airport according to an embodiment.

FIG. 1 is a diagram of a system 10, which includes a plurality of base stations (BS) 12 that are positioned at various locations around a site, such as an airport, to monitor and control the movement of vehicles at the site. The base stations 12 each have a coverage area 20 and are communicatively coupled to a control center (CC) 14, e.g., via a Local Area Network (LAN) or other appropriate back-haul technology at the site. Together, base stations 12 and control center 14 form a system that enables monitoring, tracking and controlling of a number of mobile stations (MS) 16 (e.g., aircraft, baggage carts, emergency vehicles, etc.), and which can solve some or all of the above-described problems with existing systems for tracking ground movement at a site such as an airport according to an embodiment.

These base stations 12, in one embodiment, provide an IP-based high data rate radio link according to a standard such as AeroMACS. Advantageously, the AeroMACS standard provides a high bandwidth communication link on the order of 5 to 10 Mbps along with low latency on the order of 10 ms. Additionally, the AeroMACS standard provides a priority and preemption capability that gives preference to certain messages, users or uses, e.g., messages related to safety of the vehicles traveling on the surface of the site. By incorporating this priority, the AeroMACS bandwidth can be used for other less critical applications, e.g., Voice over IP, without jeopardizing the safety of the vehicles managed by the system 10 by ensuring that the critical position information and conflict alerts can be exchanged without affecting system performance.

The base stations 12 are configured to allow communications between the control center 14 and the mobile stations 16 much like cell towers are configured to allow communications between mobile phones and a cell base station. For example, the control center 14 can be configured to send instructions (e.g., halt, proceed, return to a home position, etc.) to a mobile station 16 via the base station 12 that is wirelessly connected to the mobile station, and a mobile station 16 can be configured to send its current position, its status (e.g., in service, out of service, waiting for an instruction to proceed, instructed task complete, etc.), or an acknowledgement (e.g., instruction received) to the control center 14 via the base station 12 that is wirelessly coupled to the mobile station 16. Periodically, the control center 14 broadcasts the current position of some or all of the vehicles over some or all of the base stations 12 so that each vehicle that receives the message will know, e.g., the position and trajectory of the vehicles in its vicinity.

The base stations 12 can be configured to determine which base station should be connected to a particular mobile station, even as the mobile station is moving, in much the same way as cell towers determines which cell tower should be connected to a mobile phone even while the mobile phone is moving. The control center 14 and base stations 12 are in fixed positions, such that they may communicate with one another over a wired channel or a wireless channel in a wired, wireless or combination of wireless and wired local area network.

It is contemplated that a system provider will provide the base stations 12 and the control center 14, and the relative software and firmware for the server and base stations. In other embodiments, the system provider also can provide some or all of the mobile stations 16 and the software and firmware for the mobile stations. Moreover, although described for instantiation in an airport, the system 10 can be instantiated in or on a site (e.g., a warehouse, a military base, an offshore oil rig, etc.) other than an airport to monitor and control the operation of vehicles at the site.

Figure 2:
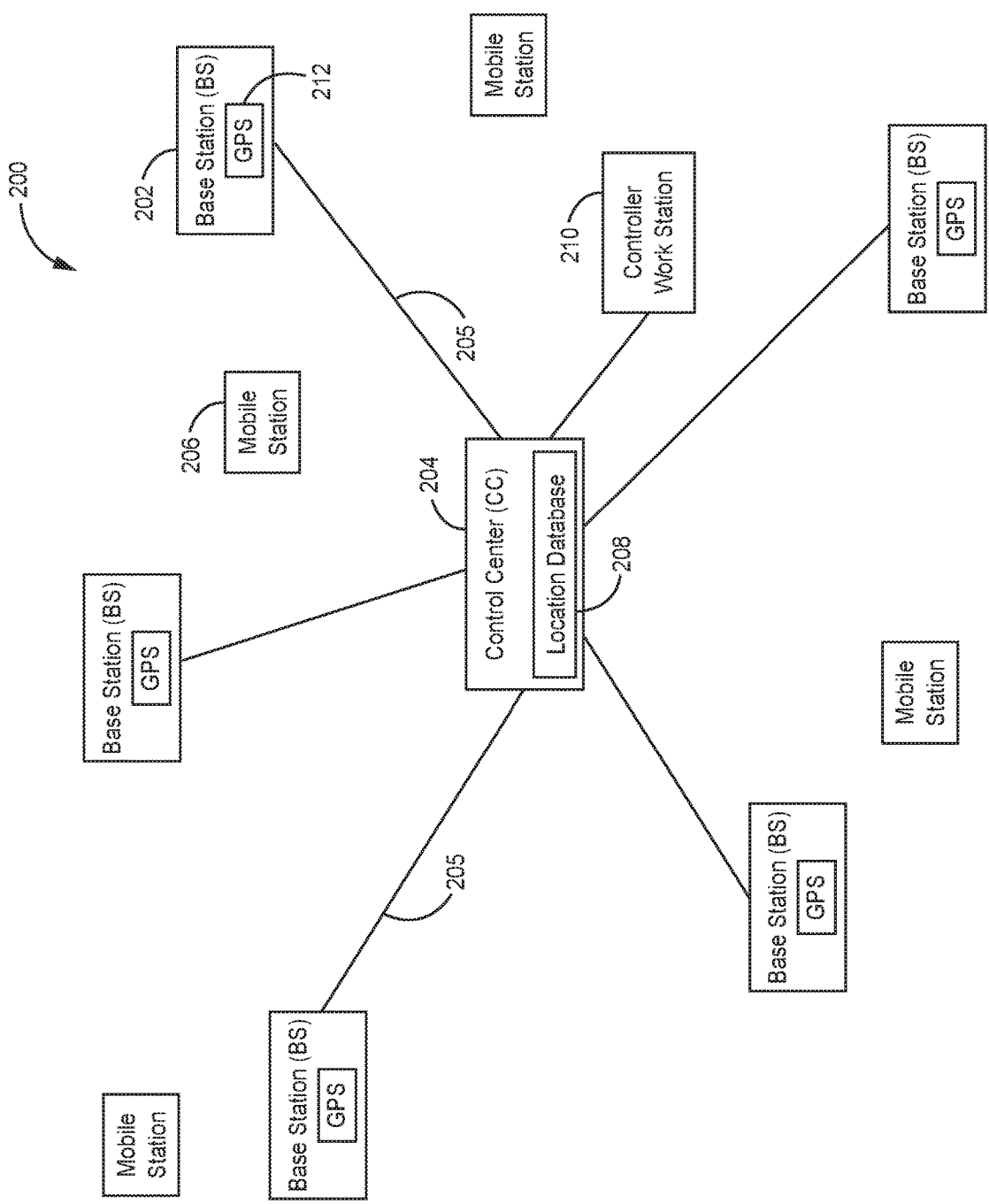
FIG. 2 is a block diagram of a system for monitoring and controlling surface vehicles and aircraft at an airport according to another embodiment.

FIG. 2 is a block diagram of another embodiment of a system, indicated generally at 200, for monitoring and controlling vehicles, e.g., surface vehicles and aircraft (collectively "mobile stations" 206) at a site such as an airport according to another embodiment. System 200 includes a plurality of base stations (BS) 202 that are positioned at various locations around the site such as an airport. These base stations 202, in one embodiment, provide an IP-based high data rate radio link according to a standard such as AeroMACS with the same advantages discussed above with respect to base stations 12 of FIG. 1. The base stations 202 are coupled to a control center 204 over the local area network (LAN) 205 of system 200. Control center 204 includes a database 208 that tracks the current location of each of the mobile stations that are in communication with system 200 via base stations 202. In some embodiments, the location database 208 stores other pieces of information regarding mobile stations 206, e.g., current trajectory, destination, fuel level, etc.

In one embodiment, the base stations 202 can be used to assist mobile stations 206 to precisely determine the location of the mobile station 206. To this end, the precise location of each base station 202 is surveyed and determined at the time system 200 is set up. Then, in operation, base station 202 uses a Global Positioning System (GPS) receiver 212 to determine its location. Base station 202 compares the output of the GPS receiver 212 to the known location and determines a correction factor. This correction factor is shared with the mobile stations 206 to improve their determination of their own location. Thus, the mobile stations 206 are able to determine their physical location to within a meter using GPS.

Figure 3:
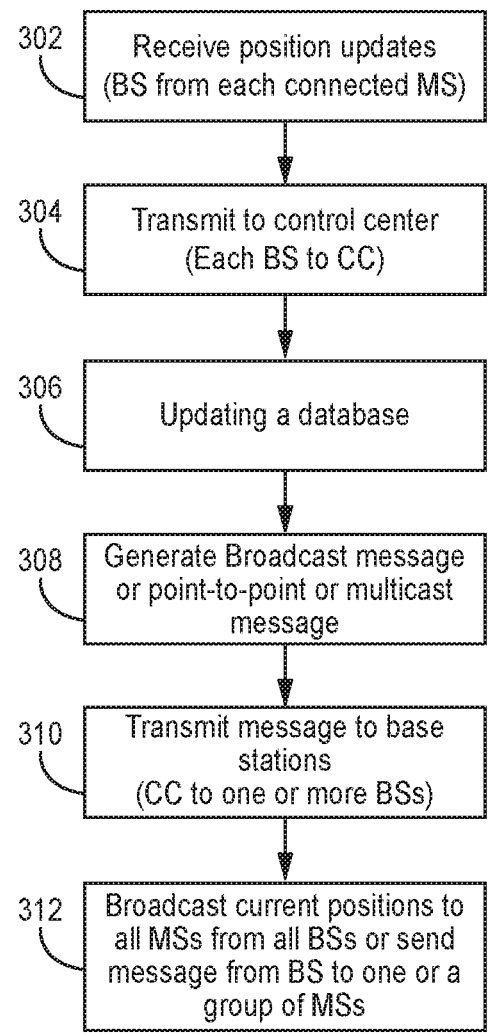
FIG. 3 is a flow chart of a process for monitoring and controlling surface vehicles and aircraft according to an embodiment.

The operation of the system of FIG. 2 is described in conjunction with FIG. 3. FIG. 3 is a flow chart of a process for monitoring and controlling vehicles, e.g., surface vehicles and aircraft on the ground at an airport, according to an embodiment. The process begins at block 302. The mobile stations 206 transmit their current location and other information on a wireless communication link between the mobile station 206 and the base station 202 to which the mobile station 206 is connected. The mobile stations 206 transmit this information on a periodic basis, e.g., once per second. In one embodiment, the packet size for the information is approximately 50 bytes. With this refresh rate and packet size, a 10 Mbps AeroMACS channel can track thousands of vehicles even assuming overhead on the data link of 20 percent.

At block 304, this information is relayed by each of the base stations 202 to the control center 204 so that the information from the mobile stations can be consolidated at block 306. The control center 204 includes a database 208 that is used to track the data from the individual mobile stations 206. Periodically, the control center 204 shares information from database 208 with one or more of the mobile stations 206. For example, control center 204 generates a broadcast, multicast or point-to-point message at block 308. This message includes information from database 208 on the various vehicles being tracked by system 200. In one embodiment, the process broadcasts the location of all mobile stations 206 to all of the mobile stations 206. In this embodiment, the broadcast message is transmitted to the base stations 202 at block 310 and broadcasted to the mobile stations at block 312. In other embodiments, position information is sent to one or more mobile stations in either a point-to-point message (via a connected base station) or in a multicast message to selected mobile stations.

In some embodiments, filtering is used on the data that is transmitted to all, some or as few as one of the mobile stations 206. For example, the data transmitted to a particular mobile station may be limited to the location of other mobile stations connected to the same base station 202 as the mobile station in a point-to-point message. Further, in other examples, the data transmitted to a mobile station 206 may be limited to potential hazards and vehicles on the current path of the mobile station 206. For aircraft, the mobile station 206 may only receive information on vehicles on its projected taxiway.

Figure 4:
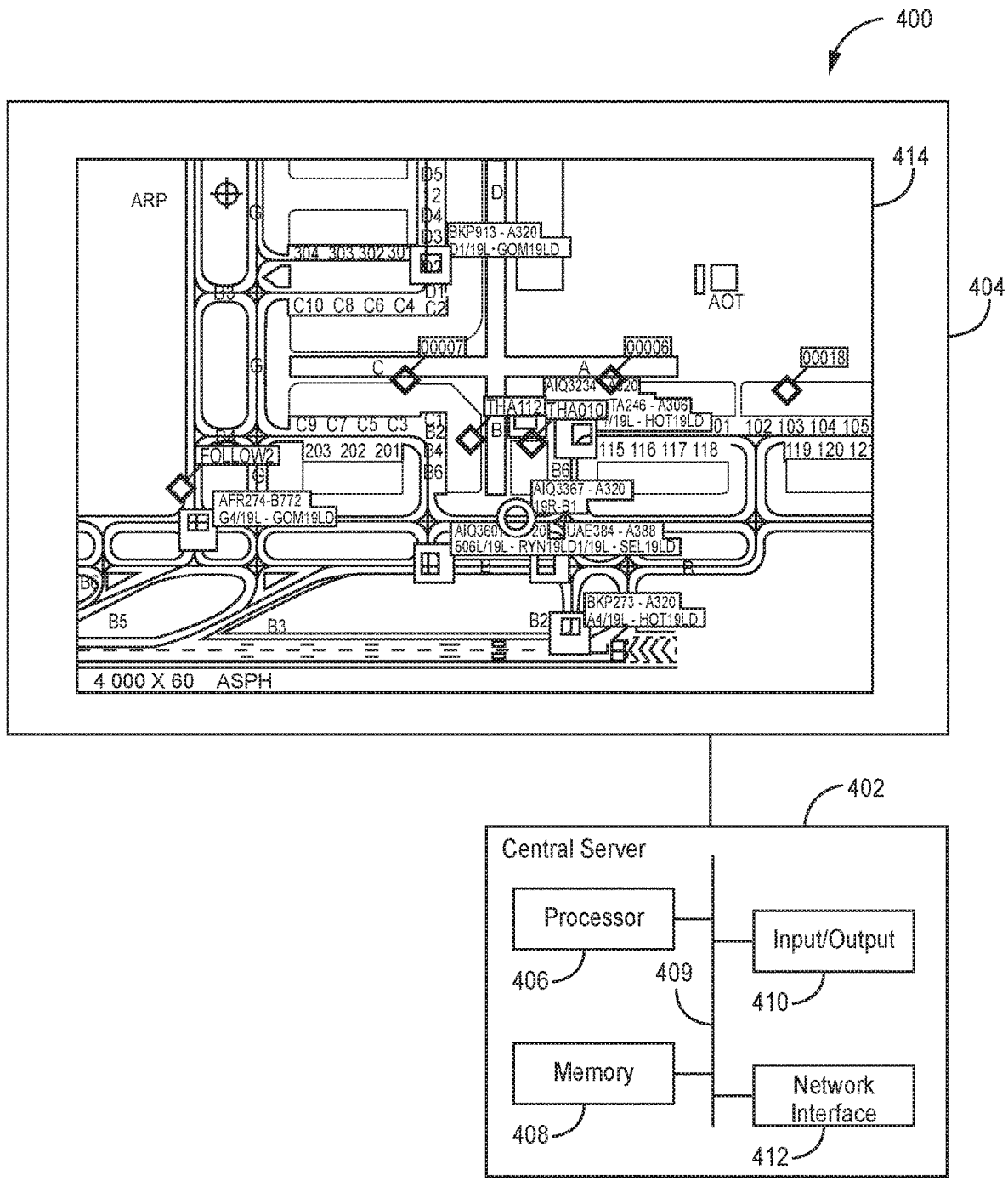
FIG. 4 is a block diagram of a control center for monitoring and controlling surface vehicles and aircraft according to an embodiment.

FIG. 4 is a block diagram of a control center 400 for monitoring and controlling vehicles, e.g., surface vehicles and aircraft at an airport, according to an embodiment. The control center includes a central server 402 that is coupled to a display 404. Central server 402 includes a processor 406 and memory 408 that are interconnected over a bus 409. Program instructions are stored on memory 408 to implement a protocol for monitoring and controlling vehicles, e.g., mobile stations 206 of FIG. 2, using a process such as the process of FIG. 3. The program instructions in memory 408 are executed on processor 406. Additionally, as processor 406 receives information from mobile devices 206, processor 406 stores the information in memory 408, for example, in a location database such as location database 208 of FIG. 2. Processor 406 also accesses the data in the location database in memory 408 to generate one or more multicast or broadcast messages to send to mobile devices 206.

Central server 402 also includes network interface 412. The network interface 412, in one embodiment, includes an Ethernet port for connecting to a Local Area Network (LAN) for the airport. In other embodiments, the network interface 412 comprises a wireless interface, e.g., an AeroMACS or other appropriate high data rate link. The multicast messages from the processor 406 are transmitted out of the network interface 412 to the base stations 202 for transmission to the mobile stations 206.

Central server 402 also displays vehicle positions on display 404. Processor 406 generates a graphical map 414 of the site, e.g., the airport, warehouse, military base, oil rig or other site, on a real-time basis, e.g., with a refresh rate of approximately 1 second. The processor 406 superimposes the current position and information about the mobile stations 206 located on the selected portion of the map. The user may zoom in or out to change the portion of the map 414 of the airport area that is displayed on the display 404. Further, the user can pan from side to side and up and down on the map 414.

Central server 402 also Includes I/O ports 410 to allow attachment of human machine interface such as keyboard, mouse and joystick to allow the user to manipulate the image presented on the display 404. In some embodiments, the input/output interface includes other components that allow the user to communicate directly with the vehicle. For example, the central server 402 may be coupled to equipment at input/output ports 410 that enable the user to provide voice or textual communication with the driver or passenger of the mobile station 206. Alternatively, input/output port 410 may be coupled to equipment that is used to remotely control a mobile station, e.g., a joy stick or other device to control the speed or direction of movement of the mobile station 206.

Figure 5:
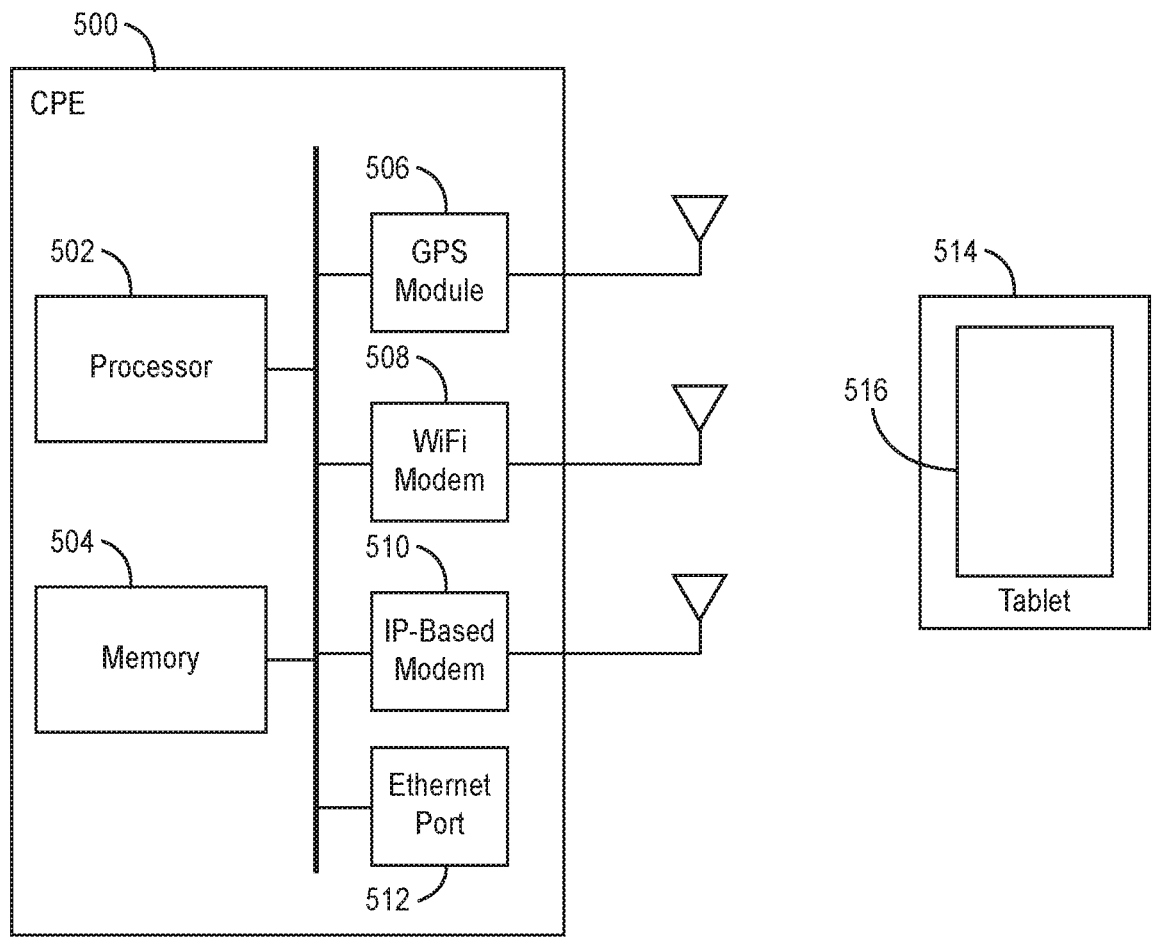
FIG. 5 is a diagram of a customer premises equipment for use in a surface vehicle and aircraft according to an embodiment.

FIG. 5 is a diagram of a customer premises equipment (CPE) 500 for use in a vehicle, such as a surface vehicle and aircraft, according to an embodiment. CPE 500 operates to determine the position of an associated surface vehicle, e.g., aircraft, baggage car, emergency vehicle, etc. Processor 502 runs software stored in memory 504 to implement the various functions of CPE 500. For example, processor 502 runs software for determining the position of CPE 500 based on information from GPS module 506. Further, processor 500 transmits the position and other information about CPE 500 and its associate vehicle via IP-based modem (e.g., AeroMACS modem) 510.

In some embodiments, CPE 500 also includes additional communication functions. For example, CPE 500 may include WiFi functionality in WiFi modem 508 to communicate with optional tablet 514. Tablet 514 includes display 516 that displays a map similar to display 404 of central server 402. Processor 502 uses the data broadcast from the central server 402 to update a database in memory 504 with the location and other information about vehicles on the airport and displays the information on a map, like shown and described above with respect to FIG. 4. Additionally, CPE 500 may also include an Ethernet port 512 to allow CPE to be plugged into a wired network for software updates, to share position information, etc.

Figure 6:
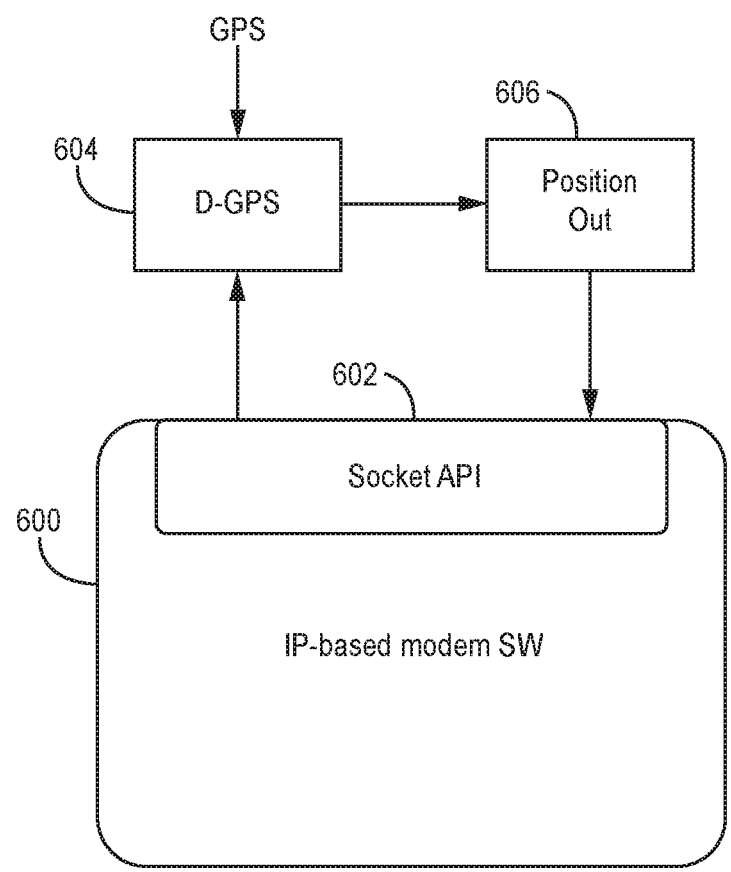
FIG. 6 is a block diagram of a software architecture for customer premises equipment for surface vehicles and aircraft according to an embodiment.

FIG. 6 is a block diagram of a software architecture for customer premises equipment 500 of FIG. 5 for use in vehicles, such as surface vehicles and aircraft, according to an embodiment. The software architecture is built on IP-based modem software (SW) 600, e.g., AeroMACS software. In one embodiment, software 600 runs on processor 502 of CPE 500. Software 600, in one embodiment, is software for implementing a modem that is compliant with the AeroMACS standard. Software 600 includes a socket API 602 that interfaces with D-GPS software 604 and position out software 606. D-GPS software 604 joins a multicast group to receive position updates for vehicles that are tracked by, for example, control center 204 of FIG. 2.

Further, D-GPS software 604 also functions to determine the location of CPE 500. To that end, D-GPS software 604 receives GPS offsets from a base station, e.g., base station 202 of FIG. 2. As discussed above, these offsets are generated by comparing the output of a local GPS receiver 212 at the base station 202 with a known position of the base station. Further, the D-GPS software 604 provides the updated offsets to position out software 606.

Position out software 606 reads the GPS position information and applies the offsets from D-GPS software 604. Position out software 606 also formats information about the CPE 500 similar to the format used in Automatic Dependent Surveillance-Broadcast (ADS-B) messages. Position out software 606 sends the information to the multicast address associated with the control center 204 to report the current status of the CPE 500.

Figure 7:
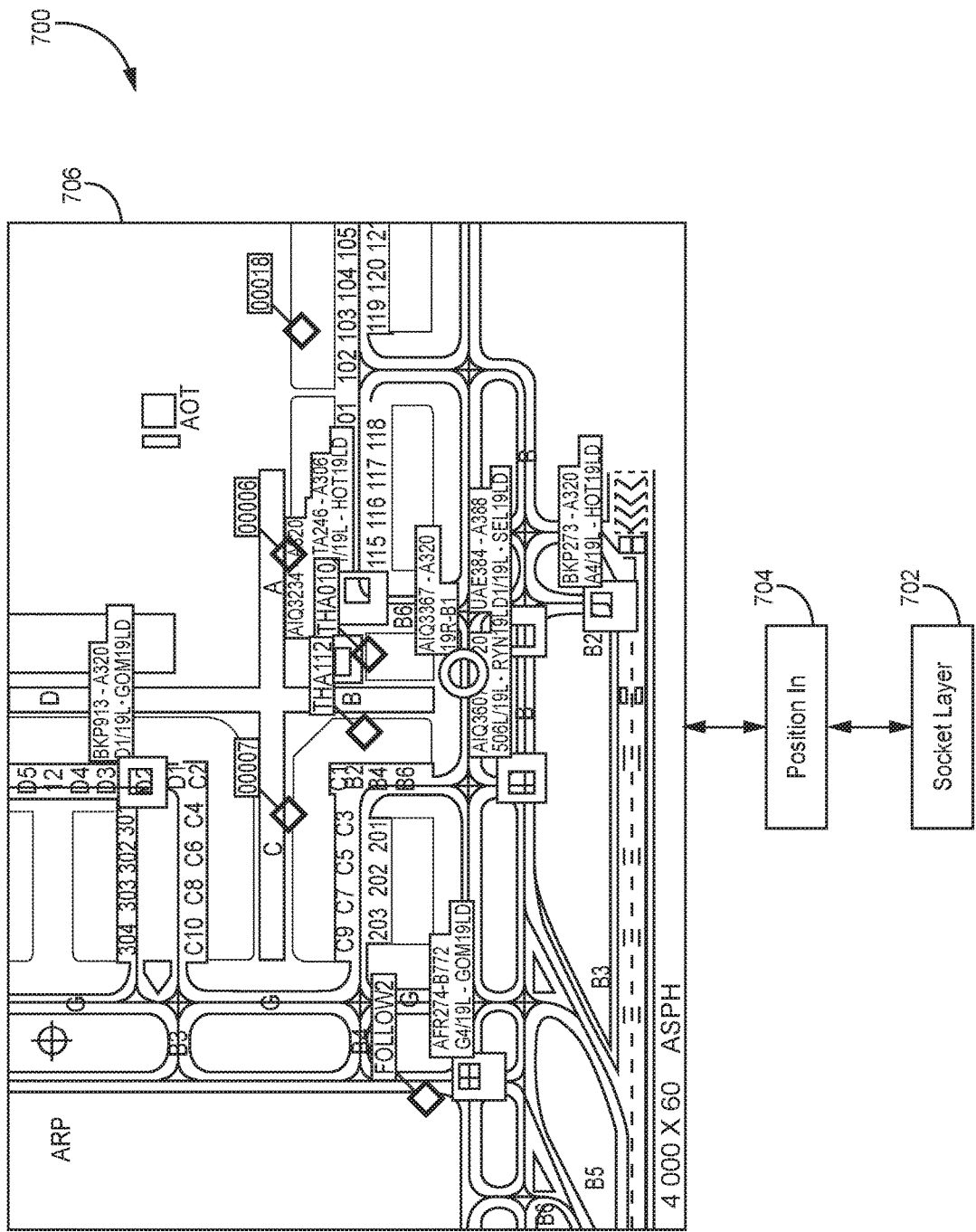
FIG. 7 is a diagram of traffic display software for a central server of FIG. 4.

FIG. 7 is a diagram of traffic display software 700 for the central server 402 of FIG. 4 or CPE 500 of FIG. 5. Socket layer 702 provides an interface between the operating system and position in software 704 running on processor 406 or processor 502. Socket layer 702 communicates information on vehicles, e.g., position and trajectory, etc. to position in software 704.

Position in software 704 receives the information via the IP-based modem 510 in CPE 500. The position in software 704 passes the information to, for example, the tablet 704 (Cockpit Display of Traffic Information (CDTI) 514 for display on screen 516. In a similar manner, software 700 can be used to display the position information on map 414 on display 404.

Figure 8:
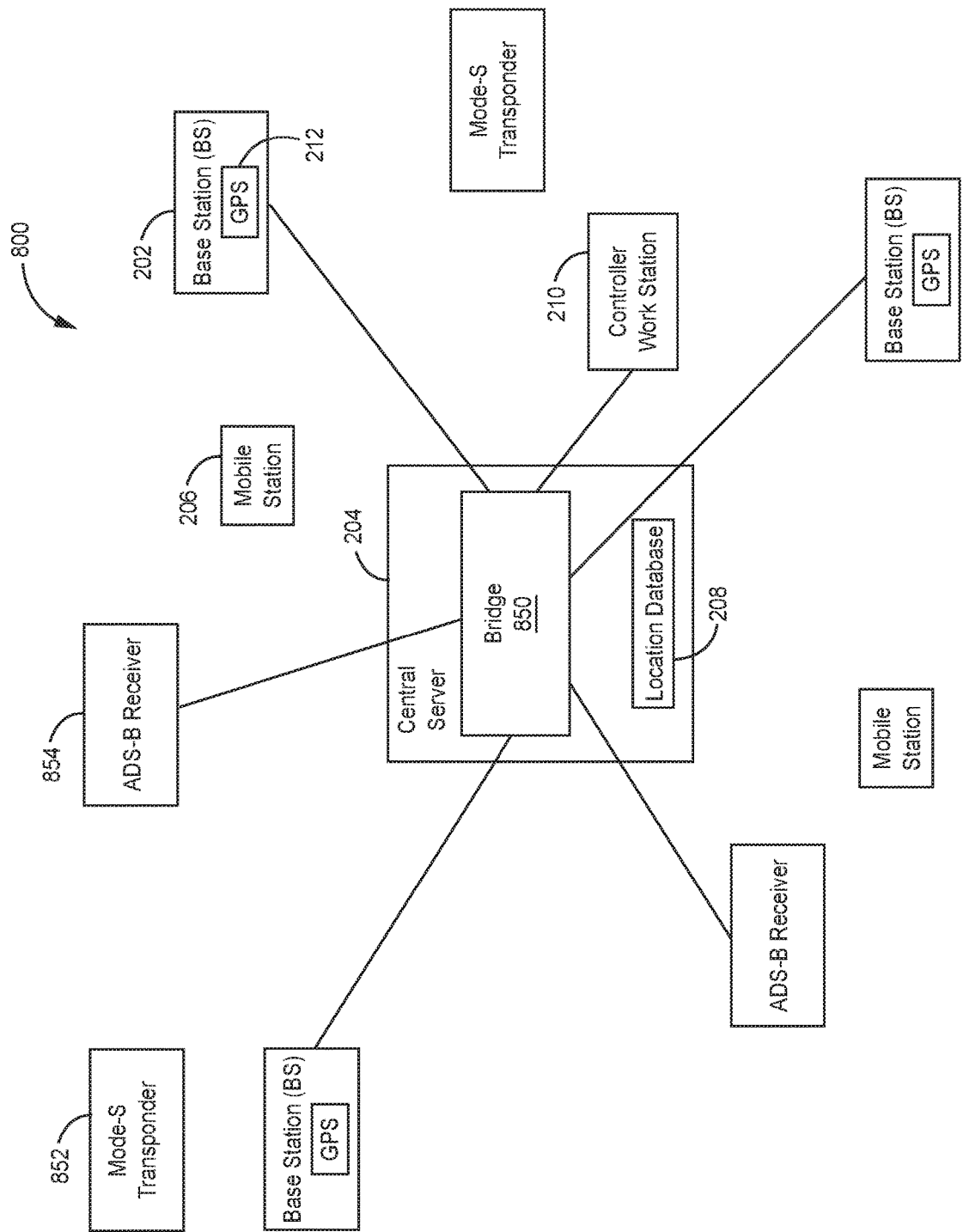
FIG. 8 is a block diagram of a system for monitoring and controlling surface vehicles and aircraft according to another embodiment.

FIG. 8 is a block diagram of a system 800 for monitoring and controlling vehicles, such as surface vehicles and aircraft, according to another embodiment. This embodiment is similar to the embodiment of FIG. 2. However, in this embodiment, the central server 204 includes a bridge 850. Bridge 850 enables system 800 to receive position data from mobile stations 206 via both base stations 202 and from Mode-S transponders 852 via ADS-B receivers 854. In other embodiments, bridge 850 is configured to communication with other sensors such as Universal Access Transceiver (UAT) transmitters, radar and or other airport-based sensors such as multilateration sensors. Bridge 850 receives data from Mode-S or UAT transponders 852 regarding the position, trajectory, etc. of an associated aircraft. This information is merged with the data from mobile stations 206 and incorporated in broadcast messages from the base stations 202 to mobile stations 206. The information from the Mode-S or UAT transponders is also included in the data presented on the display, e.g., map 414 of display 404 in control center 404 of FIG. 4. For Mobile stations equipped with both AeroMACS and UAT or Mode-S transponders, the Central Server can compare position reports received via UAT or Mode-S against position data received over AeroMACS and generate alerts on the display when any anomaly is detected.

Example Embodiments

Example 1 includes a surface movement, guidance and control system, comprising: a plurality of base stations, disposed at a site, each base station providing a coverage area and having a known geo location and using an IP-based high data rate radio link; wherein each base station is adapted to receive periodic positional updates from vehicles on the site over the IP-based high data rate radio link; and a server, communicatively coupled to the plurality of base stations, the server is configured to track and periodically transmit the location of the vehicles to the base stations; and wherein each base station broadcasts vehicle position information.

Example 2 includes the system of Example of 1, wherein the server is communicatively coupled to the plurality of base stations over a local area network, and wherein the base station comprises an AeroMACS base station.

Example 3 includes the system of example 2, wherein the local area network comprise a wired network, a wireless network or a combination of wired and wireless network connections.

Example 4 includes the system of any of examples 1-3, wherein the site is an airport and wherein the server is configured to track and periodically transmit the location of aircraft and surface vehicles.

Example 5 includes the system of example 4, wherein the server is located in a control center and the control center further includes a display coupled to the server to display, on a real-time basis, the location of the aircraft and surface vehicles.

Example 6 includes the system of example 5, wherein the server further includes a location database for storing the current location of the aircraft and surface vehicles.

Example 7. The system of any of examples 1-6, wherein each base station includes a global positioning system (GPS) receiver that the base station uses to produce and provide correction factors to the aircraft and surface vehicles to improve the accuracy of the position determinations of the vehicles.

Example 8 includes the system of any of examples 1-7, wherein the server further includes a bridge that communicates with the plurality of base stations and with a plurality of transponders, each transponder is associated with a vehicle to provide at least position information to the server.

Example 9 includes a method for providing surface guidance movement and control, the method comprising: receiving updates from a plurality of surface vehicles and aircraft at an IP-based radio link of a plurality of AeroMACS base stations; forwarding the updates from each of the plurality of AeroMACS base stations to a central server; updating a database with the updates from the plurality of surface vehicles and aircraft at the central server; generating a message containing information from the database; transmitting the message to at least one of the plurality of AeroMACS base stations; broadcasting the message from the at least one of the plurality of AeroMACS base stations.

Example 10 includes the method of example 9, wherein broadcasting the message comprises broadcasting the message from each of the plurality of AeroMACS base stations.

Example 11 includes the method of any of examples 9-10, wherein broadcasting the message comprises broadcasting the message as a multicast message from at least one of the AeroMACS base stations.

Example 12 includes the method of any of examples 9-11, wherein broadcasting the message comprises broadcasting the message as a point-to-point message from one of the plurality of base stations.

Example 13 includes the method of any of examples 9-12, wherein generating a message comprises filtering the information from the database to select information that is placed in a message to a mobile station.

Example 14 include the method of any of examples 9-13, wherein receiving updates comprises receiving updates as to at least one of position, trajectory, destination, and fuel level of one or more of the plurality of surface vehicles and aircraft.

Example 15 includes the method of any of examples 9-13, wherein generating a message comprises generating a message containing the current location of the plurality of surface vehicles and aircraft.

Example 16 includes a customer premises equipment (CPE) associated with a vehicle, the CPE comprising: a GPS module, configured to provide data relative to the position of the CPE; an IP-based modem, configured for communicating with an IP-based base station; a memory configured to store a database that includes the current location of a plurality vehicles; a processor for executing program instructions stored on a non-transitory storage medium to cause the processor to: determine the location of the CPE based on the data from the GPS module; and transmit the determined location to a central server using the IP-based modem.

Example 17 includes the CPE of example 16, wherein the IP-based modem receives the current location of the plurality of vehicles from the central server via the IP-based base station.

Example 18 includes the CPE of any of examples 16-17, wherein the memory is configured to store additional information in the database including trajectory, destination, and fuel level of one or more of the plurality of vehicles.

Example 19 includes the CPE of any of examples 16-18, wherein the program instructions further cause the processor to read position information from the GPS module and apply offsets received from the IP-based base station through the IP-based modem to the read position information.

Example 20 includes the CPE any of examples 16-19, and further including an interface for communicating with a tablet for displaying information from the database.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A surface movement, guidance and control system, comprising:
  a plurality of base stations, disposed at a site, each base station providing a coverage area and having a known geo location and using an IP-based high data rate radio link having a priority and preemption capability that gives preference to messages containing current position information of each of a plurality of vehicles on the site;
  wherein each base station includes a global positioning system (GPS) receiver that the base station uses to compare an output of the GPS receiver to the known geo location to determine correction factors for the plurality of vehicles and provide the correction factors to the plurality of vehicles,
  wherein each base station is adapted to receive a current position of each of the plurality of vehicles on the site based on the respective correction factors over the IP-based high data rate radio link in one or more priority messages generated by the vehicle; and
  a server, communicatively coupled to the plurality of base stations, wherein each base station transmits the received current position of a respective vehicle of the plurality of vehicles to the server in the one or more priority messages, and wherein the server is configured to track and periodically transmit the current position of each of the plurality of vehicles to the base stations in the one or more priority messages; and wherein each base station broadcasts the current position of each of the plurality of vehicles in the one or more priority messages.

2. The system of claim 1, wherein the server is communicatively coupled to the plurality of base stations over a local area network, and wherein the base station comprises an AeroMACS base station.

3. The system of claim 2, wherein the local area network comprise a wired network, a wireless network or a combination of wired and wireless network connections.

4. The system of claim 1, wherein the site is an airport and wherein the server is configured to track and periodically transmit the current position of aircraft and surface vehicles.

5. The system of claim 4, wherein the server is located in a control center and the control center further includes a display coupled to the server to display, on a real-time basis, the current position of the aircraft and surface vehicles.

6. The system of claim 5, wherein the server further includes a location database for storing the current position of the aircraft and surface vehicles.

7. The system of claim 1, wherein the server further includes a bridge that communicates with the plurality of base stations and with a plurality of transponders, each transponder is associated with a vehicle to provide at least position information to the server.

8. The system of claim 1, wherein the plurality of base stations are configured to determine which base station should be connected to a respective one of the plurality of vehicles.

9. A method for providing surface guidance movement and control, the method comprising:
comparing an output of a global positioning system (GPS) receiver to a known geo location of each of a plurality of AeroMACS base stations to determine correction factors for each of a plurality of vehicles;
providing the respective correction factors to each of the plurality of vehicles;
receiving priority messages with current positions generated by each of a plurality of surface vehicles and aircraft based on the respective correction factors at an IP-based radio link of the plurality of AeroMACS base stations, the IP-based radio link having a priority and preemption capability that gives preference to the priority messages with the current positions generated by each of the plurality of surface vehicles and aircraft;
forwarding the current positions from each of the plurality of AeroMACS base stations to a central server;
updating a database with the current positions from each of the plurality of surface vehicles and aircraft at the central server;
generating a priority message containing information from the database;
transmitting the generated priority message containing the information from the database to at least one of the plurality of AeroMACS base stations; and
broadcasting the generated priority message containing the information from the database from the at least one of the plurality of AeroMACS base stations.

10. The method of claim 9, wherein broadcasting the message comprises broadcasting the message from each of the plurality of AeroMACS base stations.

11. The method of claim 9, wherein broadcasting the message comprises broadcasting the message as a multicast message from at least one of the AeroMACS base stations.

12. The method of claim 9, wherein broadcasting the message comprises broadcasting the message as a point-to-point message from one of the plurality of base stations.

13. The method of claim 9, wherein generating a message comprises filtering the information from the database to select information that is placed in a message to a mobile station.

14. The method of claim 9, wherein receiving priority messages with current positions comprises receiving priority messages with current positions as to at least one of position, trajectory, destination, and fuel level of one or more of the plurality of surface vehicles and aircraft.

15. The method of claim 9, wherein generating a message comprises generating a message containing the current location of the plurality of surface vehicles and aircraft.

16. A customer premises equipment (CPE) associated with a vehicle, the CPE comprising:
a GPS module, configured to provide data relative to the position of the CPE;
an IP-based modem, configured for communicating with an IP-based base station using an IP-based high data rate radio link having a priority and preemption capability that gives preference to messages containing current position information of each of a plurality of vehicles;
a memory configured to store a database that includes current position information of each of a plurality vehicles;
a processor for executing program instructions stored on a non-transitory storage medium to cause the processor to:
receive a correction factor determined by a comparison of an output of a GPS receiver of the IP-based base station to a known geo location of the IP-based base station;
determine a current position of the CPE based on the data from the GPS module and the received correction factor; and
transmit the determined current position in a priority message to a central server using the IP-based modem.

17. The CPE of claim 16, wherein the IP-based modem receives the current positions of the plurality of vehicles from the central server via the IP-based base station.

18. The CPE of claim 16, wherein the memory is configured to store additional information in the database including trajectory, destination, and fuel level of one or more of the plurality of vehicles.

19. The CPE of claim 16, wherein the program instructions further cause the processor to read position information from the GPS module and apply offsets received from the IP-based base station through the IP-based modem to the read position information.

20. The CPE of claim 16, and further including an interface for communicating with a tablet for displaying information from the database.

* * * * *